(12) United States Patent
Ito (10) Patent No.: US 12,393,060 B2
(45) Date of Patent: Aug. 19, 2025

(54) OPTICAL ELEMENT AND OPTICAL DEVICE HAVING THE SAME

(71) Applicant: CANON KABUSHIKI KAISHA, Tokyo (JP)

(72) Inventor: Satoshi Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 18/046,444

(22) Filed: Oct. 13, 2022

(65) Prior Publication Data

US 2023/0130327 A1 Apr. 27, 2023

(30) Foreign Application Priority Data

Oct. 18, 2021 (JP) .................................. 2021-169990

(51) Int. Cl.
| | |
|---|---|
| *G02C 7/08* | (2006.01) |
| *G02C 13/00* | (2006.01) |
| *G02F 1/00* | (2006.01) |
| *G02F 1/01* | (2006.01) |
| *G02F 1/03* | (2006.01) |
| *G02F 1/1333* | (2006.01) |

(52) U.S. Cl.
CPC ............. *G02C 7/08* (2013.01); *G02C 13/001* (2013.01); *G02F 1/0045* (2013.01); *G02F 1/0123* (2013.01); *G02F 1/0316* (2013.01); *G02F 1/133345* (2013.01)

(58) Field of Classification Search
CPC ........................................................ G02C 7/08
USPC ........................................................... 349/193
See application file for complete search history.

(56) References Cited

U.S. PATENT DOCUMENTS

| | | | | |
|---|---|---|---|---|
| 2007/0183293 | A1* | 8/2007 | Murata | G11B 7/13925 369/112.02 |
| 2008/0266473 | A1* | 10/2008 | Osawa | G11B 7/13925 349/33 |
| 2018/0061858 | A1* | 3/2018 | Lee | G02F 1/136209 |
| 2018/0150166 | A1* | 5/2018 | Aoki | G06F 3/0443 |
| 2018/0356652 | A1* | 12/2018 | Shibuya | G02C 7/083 |
| 2019/0187339 | A1* | 6/2019 | Shibuya | G02F 1/29 |

FOREIGN PATENT DOCUMENTS

| | | |
|---|---|---|
| JP | 2011-516927 A | 5/2011 |
| JP | 2011180373 A | 9/2011 |
| WO | 2009/126946 A1 | 10/2009 |
| WO | 2018/016390 A1 | 1/2018 |

\* cited by examiner

*Primary Examiner* — Christopher M Raabe
(74) *Attorney, Agent, or Firm* — Canon U.S.A., Inc. IP Division (57) ABSTRACT

An optical element is switchable between a first state having a first focal length and a second state having a second focal length. The optical element includes a first electrode layer, an insulation layer, a resistance layer, a liquid crystal layer, and a second electrode layer, which are arranged in order. An electric resistance ratio of the resistance layer increases from a central part to a peripheral part.

20 Claims, 12 Drawing Sheets

(COMPARATIVE EXAMPLE)

FIG. 16

(COMPARATIVE EXAMPLE)

FIG. 17

OPTICAL ELEMENT AND OPTICAL DEVICE HAVING THE SAME

BACKGROUND

Technical Field

An aspect of embodiments relates to an optical element and an optical device having the same.

Description of the Related Art

Japanese Translation of PCT International Application Laid-Open No. ("JP") 2011-516927 discloses an electroactive element (liquid crystal lens) that can add optical power to a presbyopia power portion when a user views a close area, and that does not add optical power to the presbyopia power portion when the user views a far area.

The liquid crystal lens disclosed in JP 2011-516927 includes a progressive power lens whose curvature changes smoothly having a changeable power area at a part of the progressive power lens. Therefore, in a non-electroactive state, when the user views a far area, a scenery appears to be distorted. In addition, a diffraction grating is formed on substrate glass, and thus it is difficult to increase a size of the changeable power area.

SUMMARY

An optical element according to one aspect of embodiments of the disclosure is switchable between a first state having a first focal length and a second state having a second focal length. The optical element includes a first electrode layer, an insulation layer, a resistance layer, a liquid crystal layer, and a second electrode layer, which are arranged in order. An electric resistance ratio of the resistance layer increases from a central part to a peripheral part.

An optical device according to another aspect of the embodiments of the disclosure includes the optical element and at least one processor. The at least one processor is configured to execute a plurality of tasks including a controlling task. The controlling task is configured to change the state of the optical element to the first state and the second state.

Further features of the disclosure will become apparent from the following description of exemplary embodiments with reference to the attached drawings.

DESCRIPTION OF THE EMBODIMENTS

Referring now to the accompanying drawings, a description will be given of embodiments according to the present disclosure. Corresponding elements in respective figures are designated by same reference numerals, and a description thereof is omitted.

Figure 1:
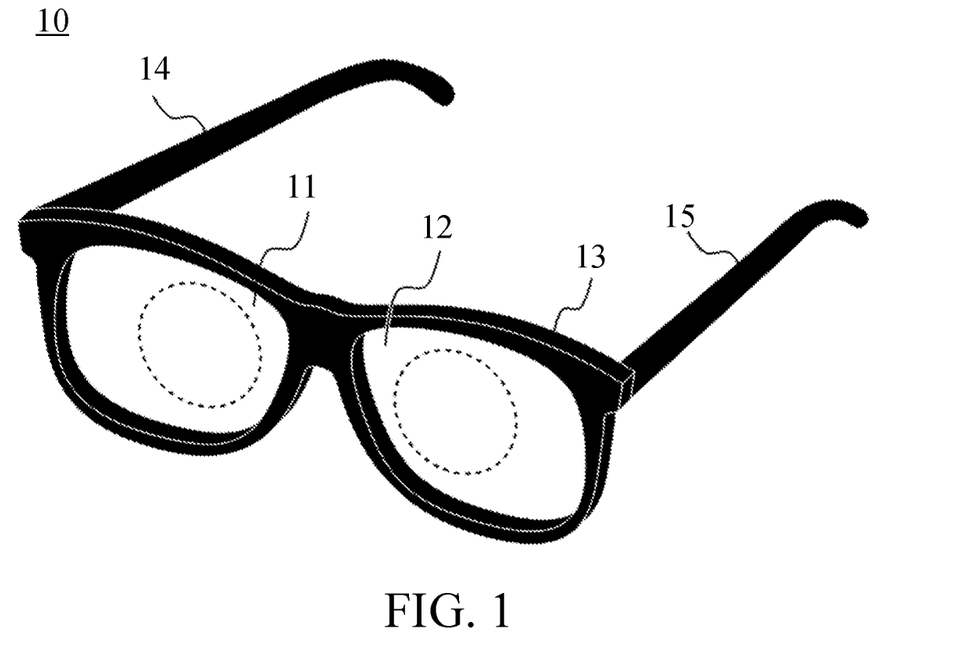
FIG. 1 is a perspective view of electronic glasses, which is an example of an optical device including an optical element according to an embodiment of the present disclosure.
Figure 2:
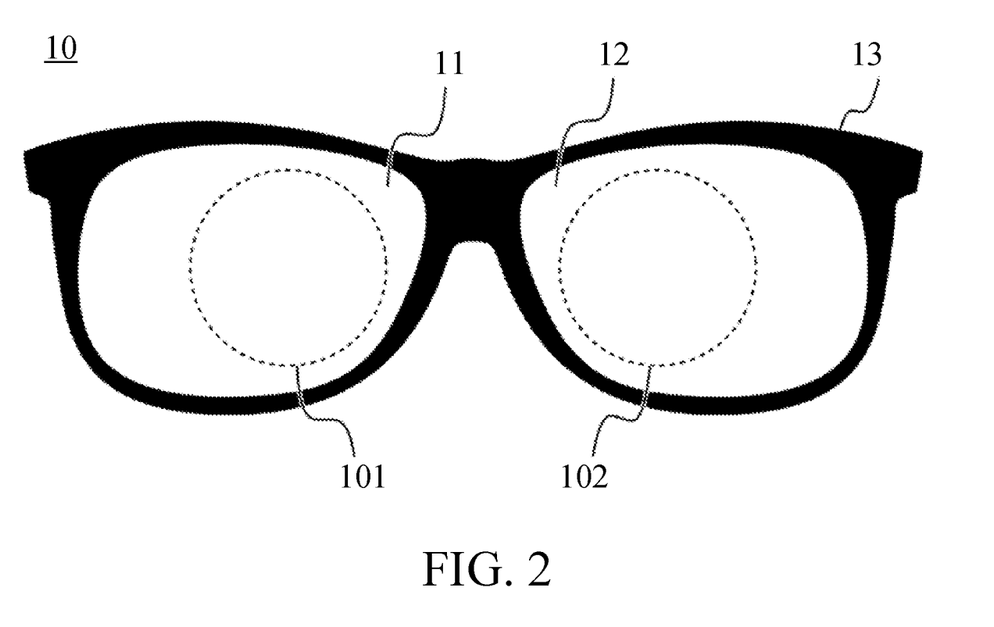
FIG. 2 is a front view of the electronic glasses.
Figure 3:
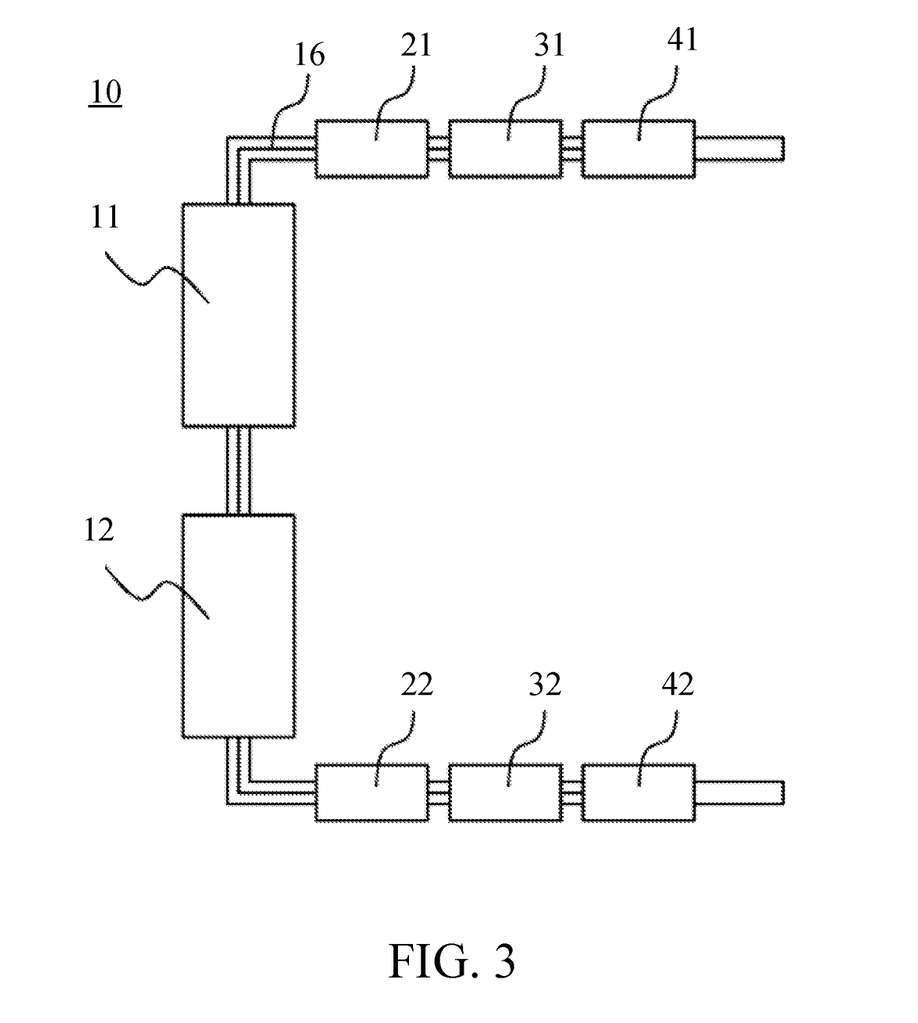
FIG. 3 is a configuration diagram of the electronic glasses.

FIG. 1 is a perspective view of electronic glasses 10, which is an example of an optical device including an optical element according to an embodiment of the present disclosure. FIG. 2 is a front view of the electronic glasses 10. FIG. 3 is a configuration diagram of the electronic glasses 10.

The electronic glasses 10 includes electroactive lenses (optical elements) 11 and 12, a frame 13, and temples 14 and 15. The electroactive lenses 11 and 12 are liquid crystal lenses having a variable focus function. The electroactive lens 11 is for a right eye and includes a changeable power area 101. The electroactive lens 12 is for a left eye and includes a changeable power area 102. A frame 13 holds the electroactive lenses 11 and 12 and includes inside a cable 16 connected to the electroactive lenses 11 and 12. The temples 14 and 15 are respectively connected to the frame 13 and respectively includes inside sensor units 21 and 22, controller units 31 and 32, and power supply units 41 and 42. The sensor units 21 and 22, the controller units (controlling task) 31 and 32, and the power supply units 41 and 42 are electrically connected to the cable 16. The controller units 31 and 32 respectively control voltages applied to the electroactive lenses 11 and 12 according to signals from the sensor units 21 and 22. The controller units 31 and 32 controls the voltages applied to the electroactive lenses 11 and 12 so that optical states can be changed of the electroactive lenses 11 and 12 (changeable power areas 101 and 102). An optical state here refers to optical power (focal length) of the changeable power areas 101 and 102.

In this embodiment, a state of the electroactive lenses 11 and 12 can be changed to a state (electroactive state) in which optical power (for example, +2D) is added to each of the changeable power areas 101 and 102 and to a state (non-electroactive state) in which optical power is not substantially added to the changeable power areas 101 and 102. Therefore, in the electronic glasses 10, optical power may not be added to each changeable power area when a user views a far area, and optical power may be added to each changeable power area when the user views a close area. Thereby, in the non-electroactive state, the electroactive lenses 11 and 12 do not include areas having different optical power and a uniform power distribution can be acquired. That is, it is possible to realize the electronic glasses 10 (electroactive lenses 11 and 12) that provides good vision with low distortion in the non-electroactive state.

In this embodiment, in the electroactive state, the electroactive lenses 11 and 12 are switchable between a first state and a second state, and a focal length in the first state (first focal length) and a focal length in the second state (second focal length) are different from each other. Specifically, in the electroactive state, the electroactive lenses 11 and 12 are switchable between the first state in which the changeable power areas 101 and 102 have first optical power and the second state in which the changeable power areas 101 and 102 have second optical power smaller than the first optical power. Each changeable power area has, for example, +2D in the first state and has, for example, +1D in the second state. That is, in this embodiment, the first optical power is twice the second optical power. Therefore, in the electronic glasses 10, in a case where the user views a close area, the first optical power may be added to each changeable power area, and in a case where the user views a middle area away from the user by, for example, a distance from the user and a monitor when the user operates a personal computer, the second optical power may be added to each changeable power area. By changing the optical power applied to each changeable power area in this way, the electronic glasses 10 (electroactive lenses 11 and 12) capable of focusing on both the close area and the middle area can be realized.

Figure 4:
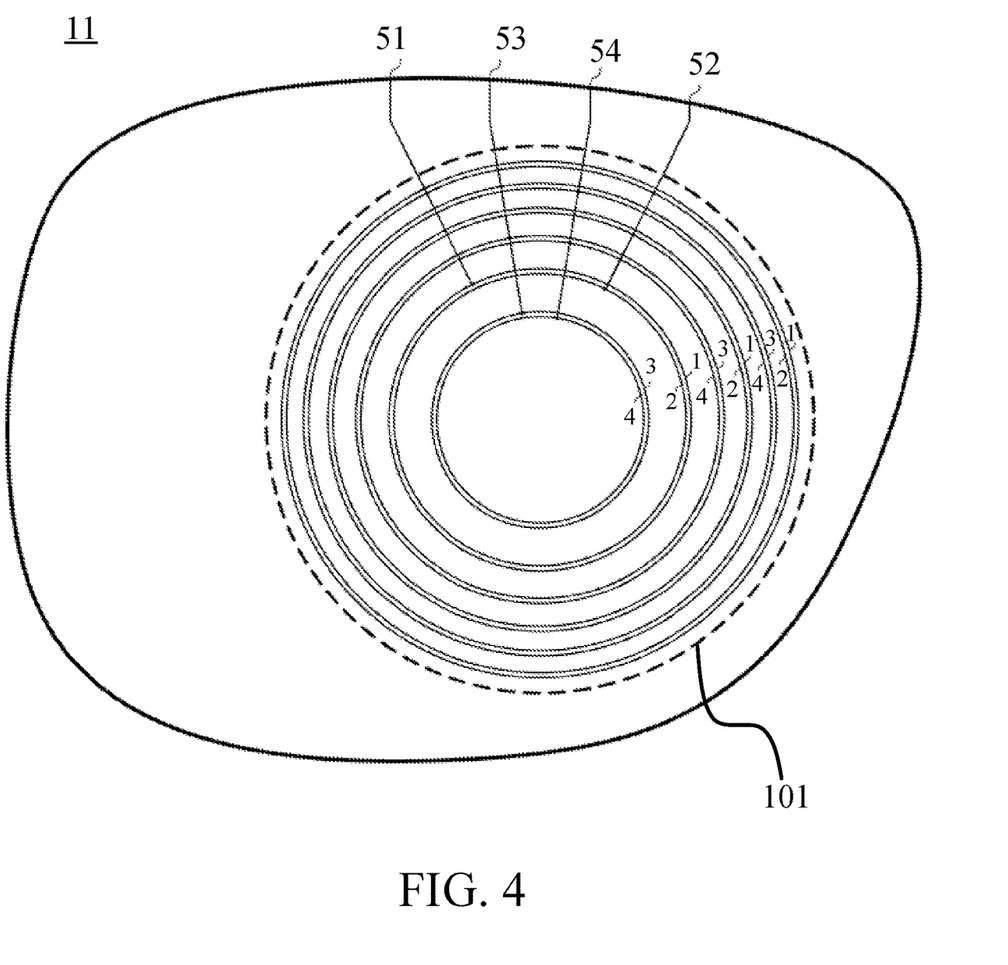
FIG. 4 is a front view of an electroactive lens.

FIG. 4 is a front view of the electroactive lens 11. An outer shape of the electroactive lens 11 is processed so that it matches a shape of the frame 13. Front and rear surfaces of the electroactive lens 11 are processed according to a diopter required for correcting a user's vision. The changeable power area 101 is formed on a user's nose side rather than a center of the electroactive lens 11. The changeable power area 101 includes optically transparent annular electrodes 1, 2, 3, and 4 arranged concentrically. The annular electrodes 1, 2, 3, and 4 are connected to leads 51, 52, 53, and 54, respectively. Each lead extends to an outer circumference of the electroactive lens 11 and is electrically connected to the cable 16.

Figure 5A:
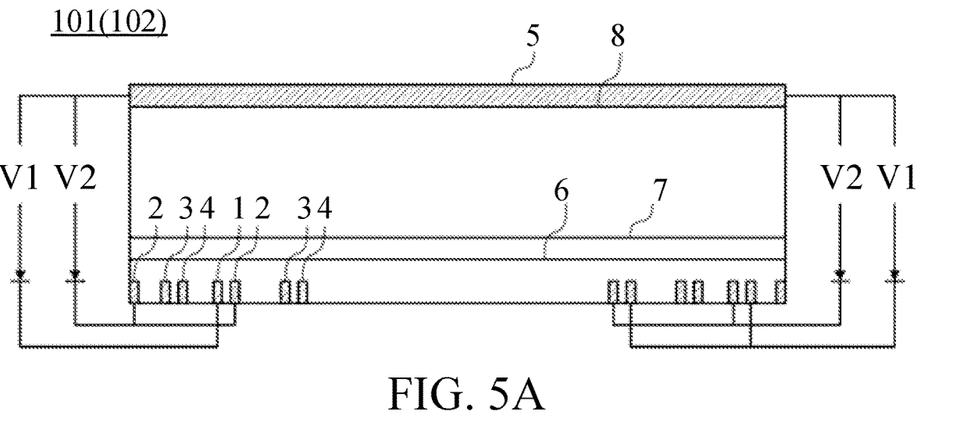
FIGS. 5A and 5B are diagrams illustrating a sectional view and optical phase difference distribution of the changeable power area in a first state.
Figure 5B:
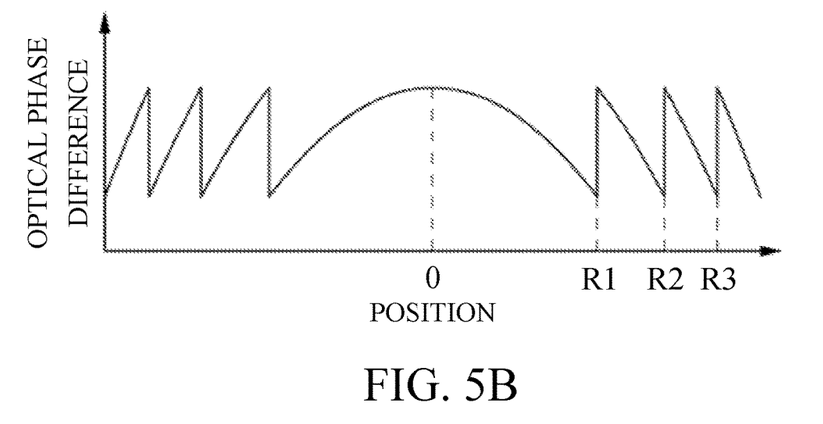
Figure 6A:
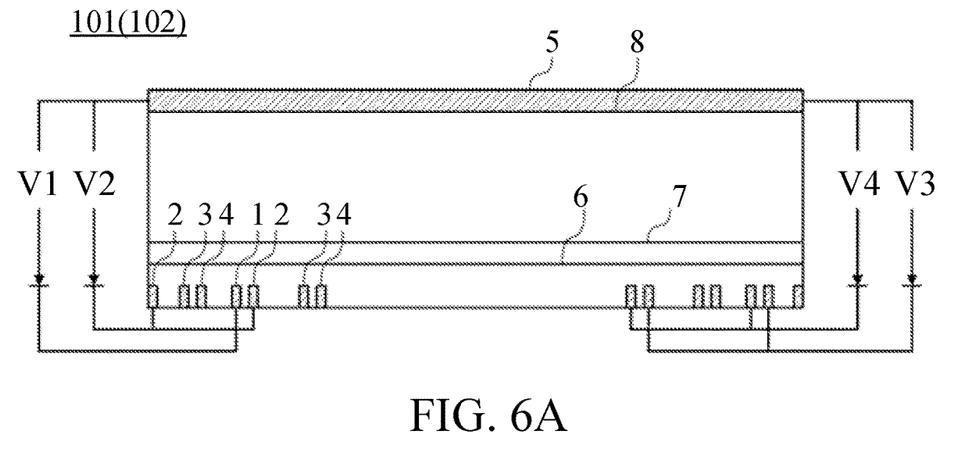
FIGS. 6A and 6B are diagrams illustrating a sectional view and an optical phase difference distribution of the changeable power area in a second state.
Figure 6B:
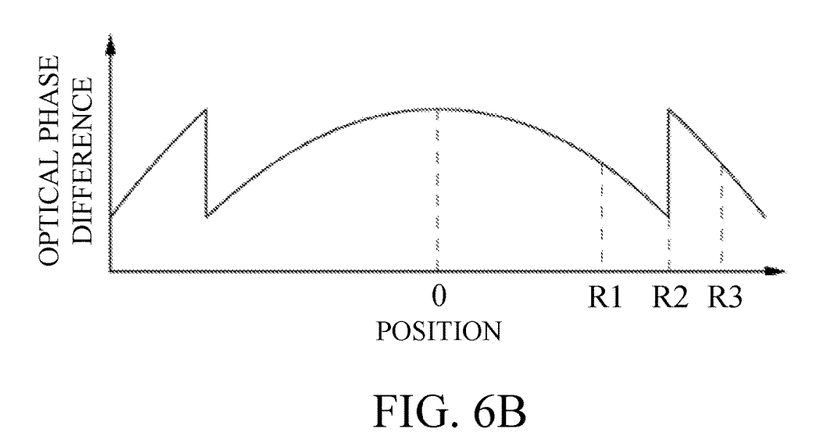
Figure 7:
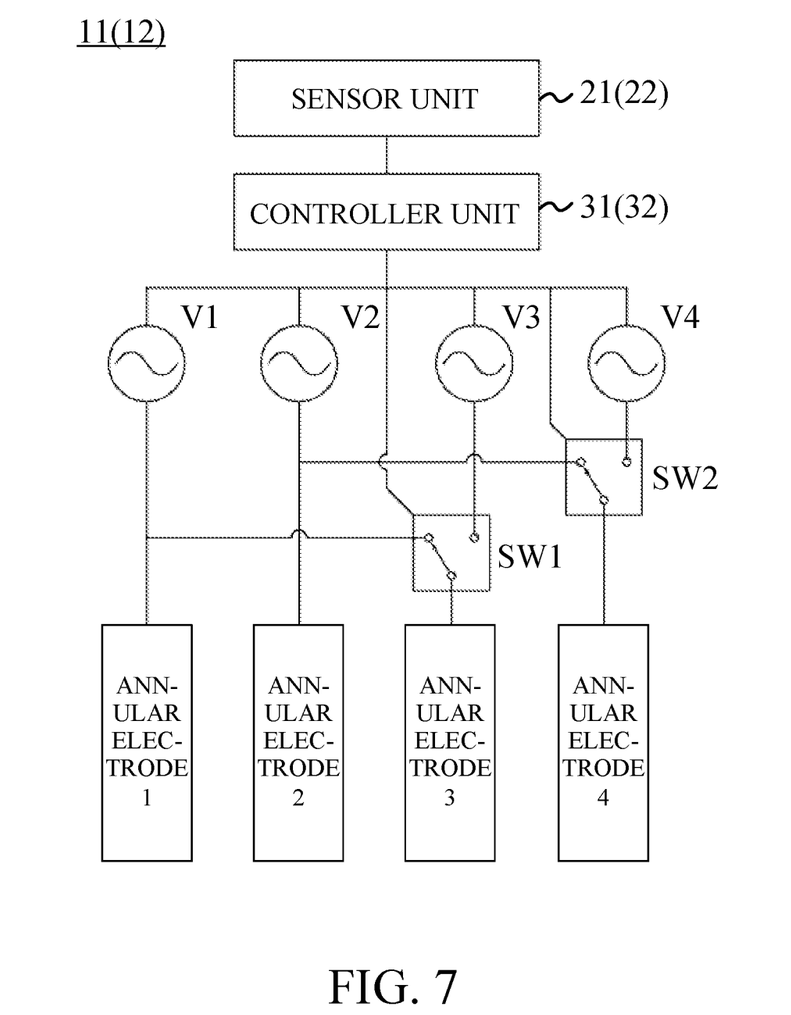
FIG. 7 is an explanatory diagram of a controlling method of the changeable power area in the first state.
Figure 8:
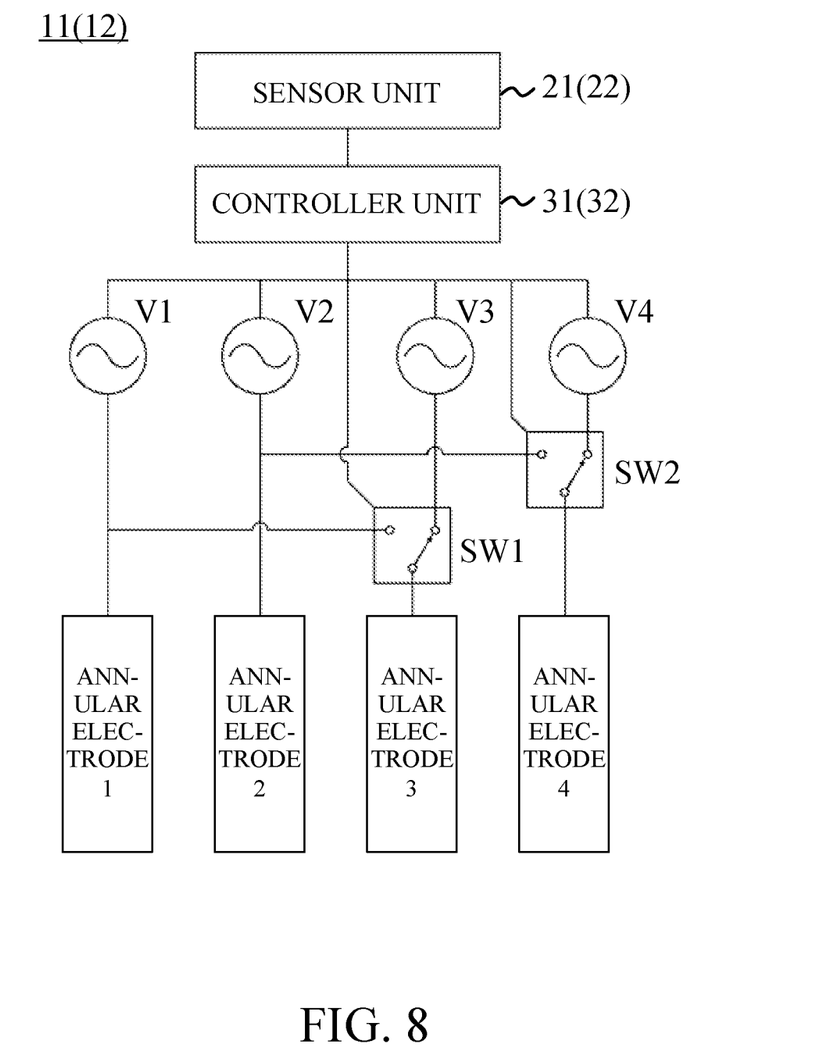
FIG. 8 is an explanatory diagram of a controlling method of the changeable power area in the second state.

Hereinafter, with reference to FIGS. 5A to 8, a description is given of a controlling method of each changeable power area when each electroactive lens is switched to the first state and the second state. FIGS. 5A and 5B are diagrams illustrating a sectional view and an optical phase difference distribution of the changeable power area 101 (102) in the first state. FIGS. 6A and 6B are diagrams illustrating a sectional view and an optical phase difference distribution of the changeable power area 101 (102) in the second state. FIG. 7 is an explanatory diagram of the controlling method of the changeable power area 101 (102) in the first state. FIG. 8 is an explanatory diagram of the controlling method of the changeable power area 101 (102) in the second state.

FIG. 5A is a configuration diagram (sectional view) of the changeable power area 101 (102) in the first state. The changeable power area 101 (102) is located between a first substrate having a planar surface or a surface having a constant curvature and a second substrate having a planar surface or a surface having a constant curvature.

The changeable power area 101 includes a first electrode layer, an insulation layer 6, a resistance layer 7, a liquid crystal layer 8, and a second electrode layer 5 which are arranged in order.

The first electrode layer includes the annular electrodes 1, 2, 3, and 4. The second electrode layer 5 is an optically transparent single electrode layer. The first electrode layer and the second electrode layer 5 are made of, for example, transmissive conductive oxide (ITO, titanium oxide, zinc oxide, or mixtures thereof) or conductive organic materials (PEDOT: PSS or carbon nanotubes).

The insulation layer 6 is optically transparent, is provided between the first electrode layer and the resistance layer 7, and electrically insulates the annular electrodes from each other. The insulation layer 6 is made of, for example, silicon dioxide ($SiO_2$). A thickness of the insulation layer 6 may be 0.01 μm or more and 1 μm or less. An electric resistance ratio of the insulation layer 6 may be $1 \times 10^8$ Ω·cm or more and $1 \times 10^{12}$ Ω·cm or less.

The resistance layer 7 is optically transparent and is provided between the insulation layer 6 and the liquid crystal layer 8. Providing the resistance layer 7 can make the voltage smoothly change between annular electrodes to which voltages of different magnitudes are applied. The resistance layer 7 is made of, for example, transmissive conductive oxide (such as zinc oxide) or conductive organic material (such as PEDOT: PSS and carbon nanotubes). A thickness of the resistance layer 7 may be 0.01 μm or more and 1 μm or less. An electric resistance ratio of the resistance layer 7 may be $1 \times 10^2$ Ω·cm or more and $1 \times 10^7$ Ω·cm or less.

The liquid crystal layer 8 is provided between the resistance layer 7 and the second electrode layer 5. The controller unit 31 (32) controls voltages applied to the first electrode layer and the second electrode layer 5 so as to adjust an orientation distribution of the liquid crystal layer 8. Adjusting the orientation distribution of the liquid crystal layer 8 can impart a desired optical phase difference distribution to incident light.

An unillustrated alignment film is in contact with the liquid crystal layer 8. The alignment film is a thin film and is made of, for example, polyimide material or the like. A thickness of the alignment film may be 0.1 μm or less. The alignment film has been subjected to a rubbing process or a photo-aligning process that irradiates the alignment film with linearly polarized ultraviolet rays. Thereby, initial orientations of the liquid crystal molecules inside the liquid crystal layer 8 can be controlled.

In this embodiment, the following inequality (1) may be satisfied where R1 represents the electric resistance ratio of the insulation layer 6 and R2 represents the electric resistance ratio of the resistance layer 7.

$$1 \times 10^{-7} < R2/R1 < 1 \times 10^{-3} \tag{1}$$

When the inequality (1) is satisfied, the changeable power area 101 (102) can be sufficiently large. If the value is larger than the upper limit of the inequality (1), an electric potential distribution applied to the liquid crystal layer 8 does not become a Fresnel lens shape or a diffractive lens shape, making not smooth a refractive index distribution of the liquid crystal layer 8. If the value is smaller than the lower limit of the inequality (1), an absolute value of electric potential applied to the liquid crystal layer 8 is too small, making insufficient the refractive index distribution of the liquid crystal layer 8.

The numerical range of the inequality (1) may be set to a numerical range of the following inequality (1a).

$$5 \times 10^{-7} < R2/R1 < 5 \times 10^{-4} \tag{1a}$$

The numerical range of the inequality (1) may be set to a numerical range of the following inequality (1b).

$$1\times10^{-6} < R2/R1 < 1\times10^{-4} \quad (1b)$$

FIG. 5B illustrates an optical phase difference distribution occurring in the liquid crystal layer 8 in the first state. A thickness of the liquid crystal layer 8 can be made thin by making the optical phase difference distribution a Fresnel lens shape or a diffraction lens shape. The annular electrodes 1, 2, 3, and 4 are concentrically arranged so that the optical phase difference distribution has a Fresnel lens shape or a diffractive lens shape. A size of each annular electrode is determined by the shape of the optical phase difference distribution. The following equation (2) expresses a distance (radius) rn from a center of the annular electrode arrangement to a position where the optical phase difference switches.

$$rn = n^{1/2} \times r1 \quad (2)$$

Here, r1 represents a distance from the center of the annular electrode arrangement to a position closest to the center of the annular electrode arrangement in positions at each of which the optical phase difference switches, and n represents an integer of 2 or more.

The annular electrodes 1, 2, 3, and 4 are arranged so that each of the positions where the optical phase difference switches is located between paired two of the annular electrodes (hereinafter also referred to as a pair of annular electrodes). In this embodiment, the annular electrodes 1 and 2 are a pair of annular electrodes, and the annular electrodes 3 and 4 are a pair of annular electrodes. In the positions where the optical phase difference switches, a position closest to the center of the annular electrode arrangement is located between the annular electrodes 3 and 4, and a position second closest to the center of the annular electrode arrangement is located between the annular electrodes 1 and 2.

The controller unit 31 (32) controls the voltage applied to each annular electrode according to the signal from the sensor unit 21 (22). In the first state, a first voltage V1 is applied to each of the annular electrodes 1 and 3, and a second voltage V2 different from the first voltage V1 is applied to each of the annular electrodes 2 and 4. At this time, a switch unit SW1 is controlled so that the first voltage V1 is applied to the annular electrode 3, and a switch unit SW2 is controlled so that the second voltage V2 is applied to the annular electrode 4. This makes it possible to acquire the optical phase difference distribution illustrated in FIG. 5B.

FIG. 6A is a configuration diagram of the changeable power area 101 (102) 101 in the second state. FIG. 6B is a diagram illustrating the optical phase difference distribution occurring in the liquid crystal layer 8 in the second state.

In the second state, the first voltage V1 is applied to the annular electrode 1, and the second voltage V2 is applied to the annular electrode 2, as in the first state. A third voltage V3 is applied to the annular electrode 3, and a fourth voltage V4 is applied to the annular electrode 4. At this time, the switch unit SW1 is controlled so that the third voltage V3 is applied to the annular electrode 3, and the switch unit SW2 is controlled so that the fourth voltage V4 is applied to the annular electrode 4. This makes it possible to acquire the optical phase difference distribution illustrated in FIG. 6B.

In this embodiment, the third voltage V3 and the fourth voltage V4 are set to be substantially equal to an average of the first voltage V1 and the second voltage V2 (=(V1+V2)/2). That is, such a voltage (=(V1+V2)/2) is applied to each of a pair of annular electrodes located at positions where the index n of the distance rn expressed by the equality (1) from the center of the annular electrode arrangement to the position where the optical phase difference switches is an odd number. As a result, in the second state, it is possible to acquire an optical phase difference distribution in which a switching pitch of the optical phase difference is twice a switching pitch of the optical phase difference distribution in the first state.

Figures 9A, 9B:
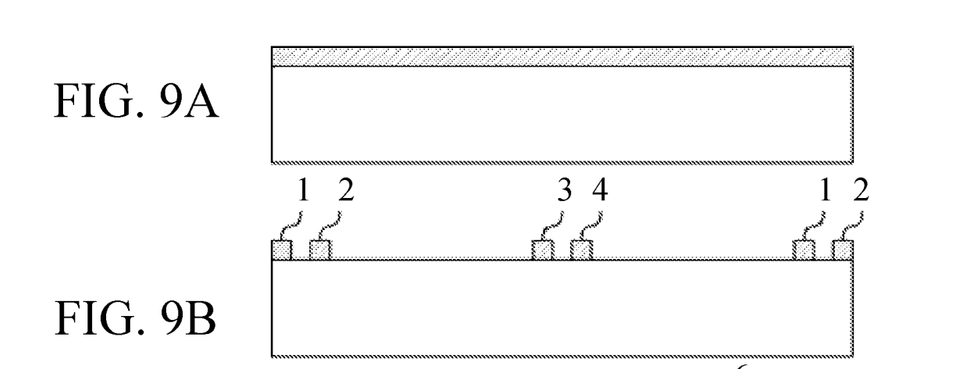
FIGS. 9A to 9F are explanatory diagrams of a manufacturing method of a first electrode layer.
Figure 9C:
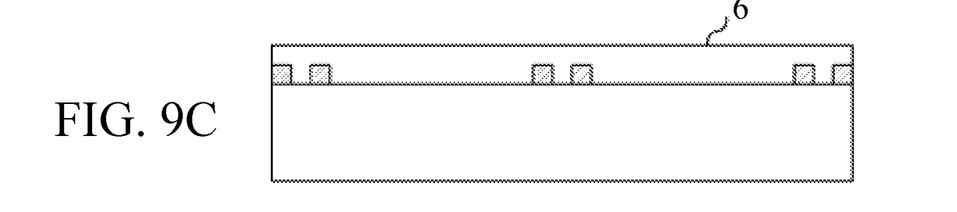
Figure 9D:
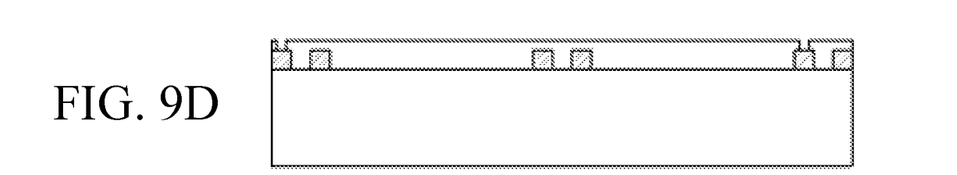
Figure 9E:
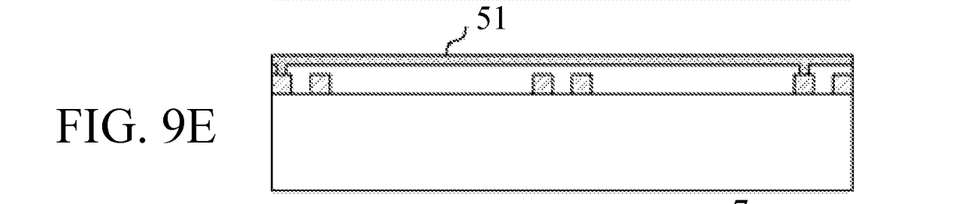
Figure 9F:
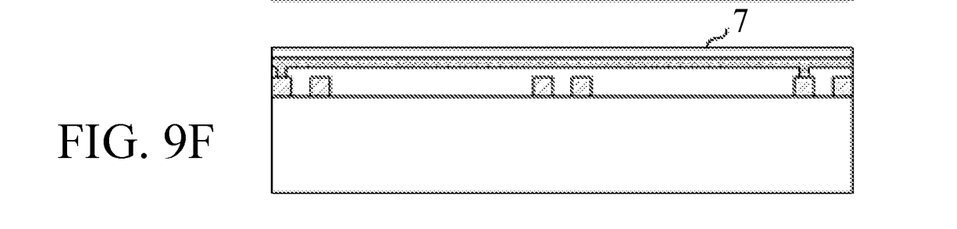

Next, with reference to FIGS. 9A to 9F, a description is given of a manufacturing method of the first electrode layer. FIGS. 9A to 9F are explanatory diagrams of the manufacturing method of the first electrode layer. First, as illustrated in FIG. 9A, a uniform electrode layer is formed on a glass substrate by vapor deposition or sputtering. Next, as illustrated in FIG. 9B, concentric annular shapes are patterned by etching the uniform electrode layer so that the annular electrodes 1, 2, 3, and 4 are formed. Thereafter, as illustrated in FIG. 9C, a uniform insulation layer 6 is formed on the annular electrodes 1, 2, 3, and 4 by vapor deposition or sputtering. Next, as illustrated in FIG. 9D, etching forms rectangular openings above the annular electrodes to be electrically connected. Subsequently, as illustrated in FIG. 9E, a lead electrode layer is formed by vapor deposition or sputtering, and the leads 51, 52, 53, and 54 are patterned by etching. Finally, as illustrated in FIG. 9F, a uniform resistance layer 7 is formed by vapor deposition or sputtering.

Figure 10:
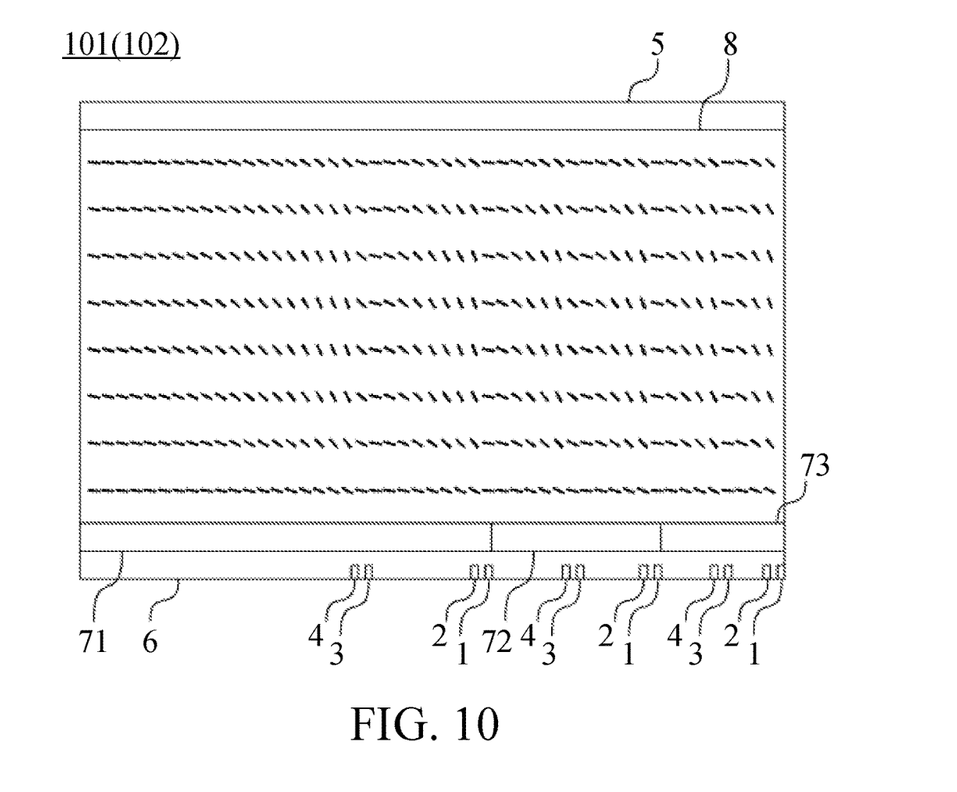
FIG. 10 is a diagram illustrating an orientation distribution of liquid crystal molecules in the first state.
Figure 11:
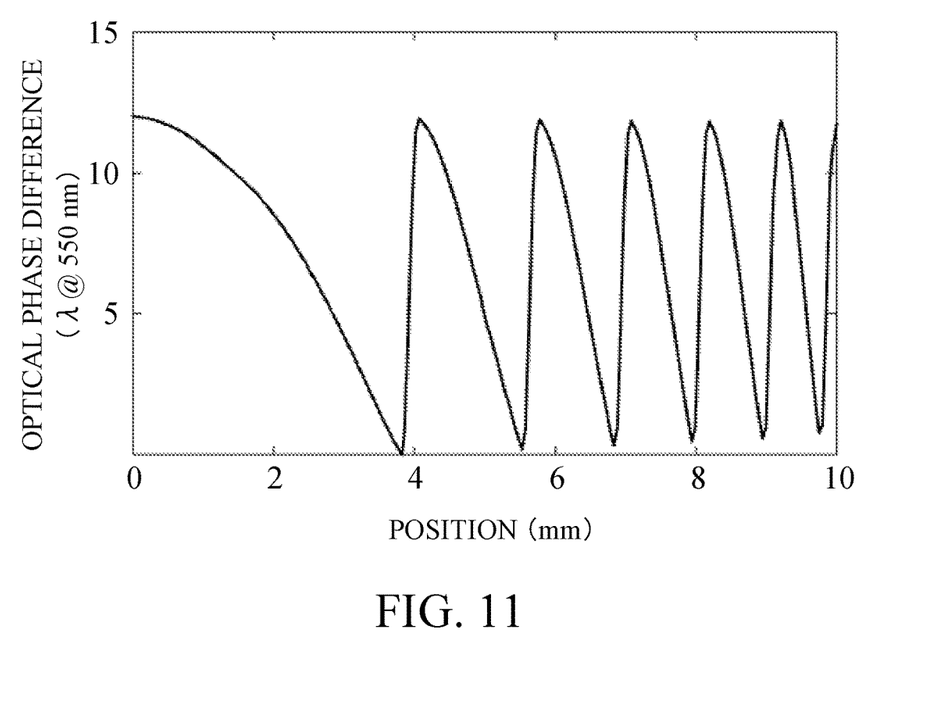
FIG. 11 is a diagram illustrating the optical phase difference distribution occurring in the liquid crystal layer in the first state.

FIG. 10 is a diagram illustrating an orientation distribution of liquid crystal molecules in the first state, acquired by simulation. FIG. 11 is a diagram illustrating an optical phase difference distribution occurring in the liquid crystal layer 8 in the first state.

Conditions for the simulation are described below. Materials of the annular electrodes 1, 2, 3, and 4 and the second electrode layer 5 are ITO. A thickness of each annular electrode is 50 nm. A material of the insulation layer 6 is silicon dioxide ($SiO_2$). A thickness of the insulation layer 6 is 0.1 μm. The insulation layer 6 has a sheet resistance of $1\times10^{15}\Omega$ and an electric resistance ratio of $1\times10^{10}$ Ω·cm. The resistance layer 7 includes resistance layers 71, 72, and 73 having respective electric resistance ratios different from each other. Materials of the resistance layers 71, 72, and 73 are a compound whose main component is zinc oxide (ZnO). Thicknesses of the resistance layers 71, 72, and 73 are 0.25 μm. The resistance layer 71 has a sheet resistance of $4\times10^8\Omega$ and an electric resistance ratio of $1\times10^4$ Ω·cm. The resistance layer 72 has a sheet resistance of $30\times10^8\Omega$ and an electric resistance ratio of $7.5\times10^4$ Ω·cm. The resistance layer 73 has a sheet resistance of $60\times10^8\Omega$ and an electric resistance ratio of $15\times10^4$ Ω·cm. A material of the liquid crystal layer 8 is nematic liquid crystal E7. A birefringence Δn of the nematic liquid crystal E7 is 0.22 for light with a wavelength of 550 nm. A thickness of the liquid crystal layer 8 is 50 μm. A pretilt angle between the upper and lower surfaces of the liquid crystal layer 8 is 3°. The first voltage V1 is 1 V and its frequency is 100 Hz. The second voltage V2 is 2.5V and its frequency is 100 Hz. The second electrode layer 5 serves as a ground, and a voltage applied to the second electrode layer 5 is 0 V.

In FIG. 10, a left end is a center position of the changeable power area 101 (102), and a distance from a right end to the left end is 10 mm. That is, a diameter of the changeable power area 101 (102) is 20 mm. At positions where the first voltage V1 is applied, the liquid crystal molecules are horizontal (or lie) and effective refractive indexes are high. At positions where the second voltage V2 is applied, the liquid crystal molecules rise according to a direction of an electric field and the effective refractive indexes are low. In an area between positions where the first and second voltage V1 and V2 are respectively applied, the voltage changes smoothly due to the action of the resistance layer 7, and thus the orientations of the liquid crystal molecules also change smoothly. As a result, a smooth-shaped refractive index distribution can be realized, so that a smooth optical phase difference distribution having a Fresnel lens shape can be acquired as illustrated in FIG. 11.

Figure 12:
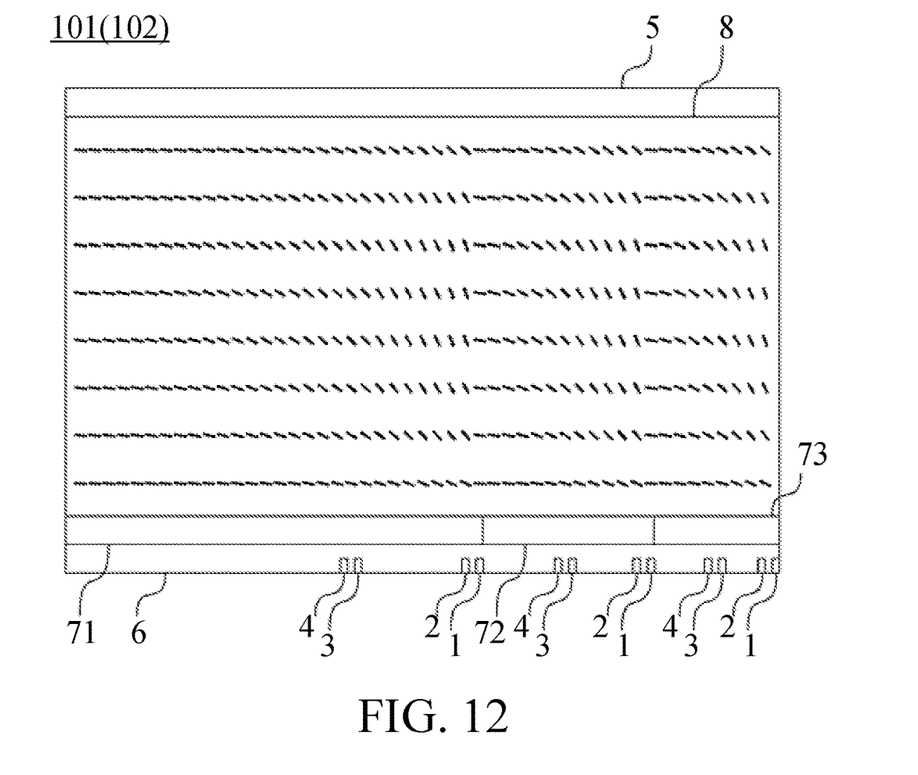
FIG. 12 is a diagram illustrating an orientation distribution of liquid crystal molecules in the second state.
Figure 13:
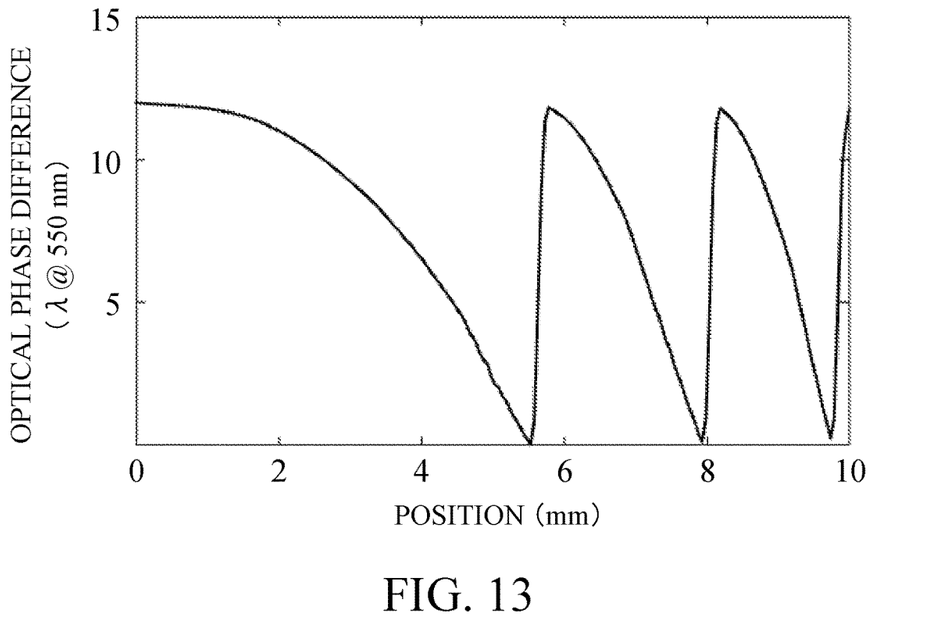
FIG. 13 is a diagram illustrating the optical phase difference distribution occurring in the liquid crystal layer in the second state.

FIG. 12 is a diagram illustrating the orientation distribution of liquid crystal molecules in the second state, acquired by simulation. FIG. 13 is a diagram illustrating the optical phase difference distribution occurring in the liquid crystal layer 8 in the second state.

Conditions for the simulation used to acquire the orientation distribution illustrated FIG. 12 are basically similar to the conditions for the simulation used to acquire the orientation distribution illustrated in FIG. 10, but are different in the third and fourth voltages V3 and V4 applied to the annular electrodes 3 and 4. The third voltage V3 is 1.8V and its frequency is 100 Hz. The fourth voltage V4 is 1.7 V and its frequency is 100 Hz. The third and fourth voltages V3 and V4 are substantially equal to the average 2V (=(V1+V2)/2) of the first and second voltages V1 and V2.

In FIG. 12, at positions where the third and fourth voltage V3 and V4 are respectively applied, orientations of the liquid crystal molecules change smoothly without a discontinuity. As illustrated in FIG. 13, it is possible to acquire the smooth optical phase difference distribution having a Fresnel lens shape whose pitch is twice the pitch of the optical phase difference distribution in the first state. Thus, the average of the first and second voltages V1 and V2 are applied to the pairs of annular electrodes located at positions at each of which the index n of the distance rn from the center of the annular electrode arrangement to the position where the optical phase difference switches is an odd number. As a result, in the second state, it is possible to acquire a gentle optical phase difference distribution in which the switching pitch of the optical phase difference is twice the switching pitch of the optical phase difference distribution in the first state.

Figure 14:
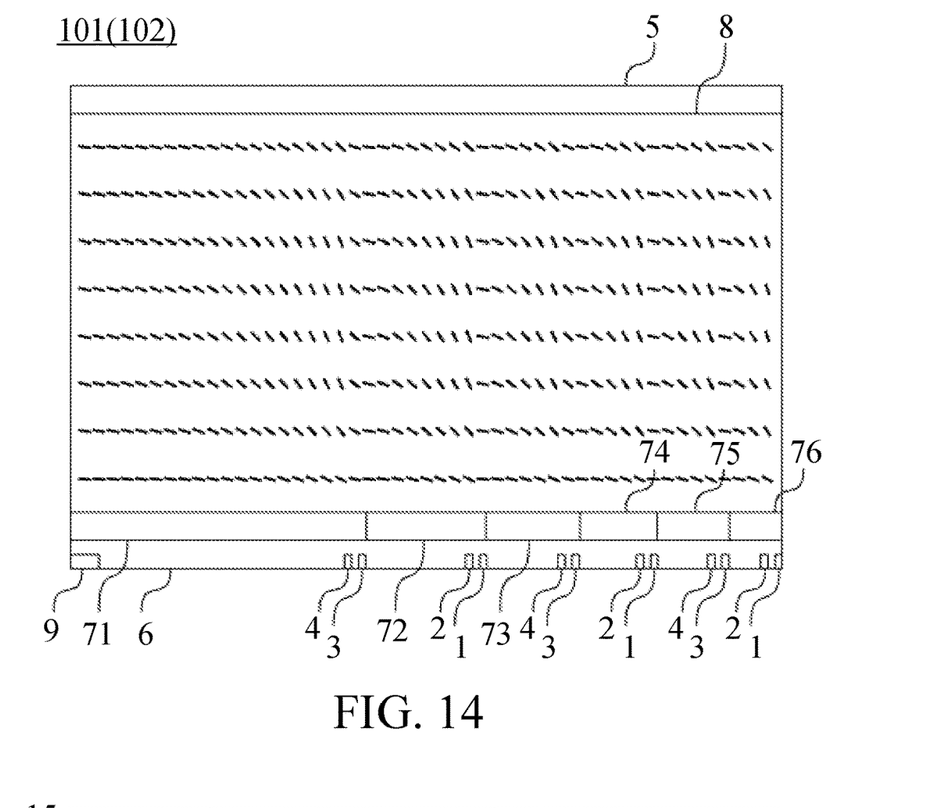
FIG. 14 is a diagram illustrating another example of an orientation distribution of liquid crystal molecules in the first state.
Figure 15:
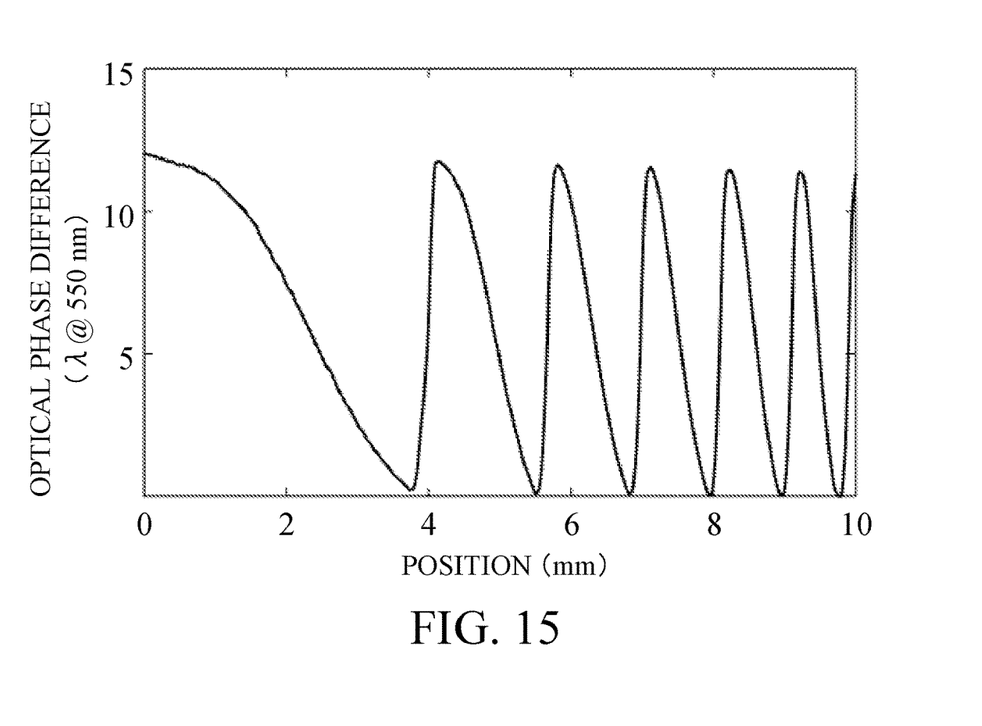
FIG. 15 is a diagram illustrating another example of an optical phase difference distribution occurring in the liquid crystal layer in the first state.

FIG. 14 is a diagram illustrating another example of an orientation distribution of liquid crystal molecules in the first state, acquired by simulation. FIG. 15 is a diagram illustrating another example of an optical phase difference distribution occurring in the liquid crystal layer 8 in the first state.

Conditions for the simulation are described below. Materials of the annular electrodes 1, 2, 3, and 4 and the second electrode layer 5 are ITO. A material of the insulation layer 6 is silicon dioxide ($SiO_2$). A thickness of the insulation layer 6 is 0.15 μm. The insulation layer 6 has a sheet resistance of $1 \times 10^{15} \Omega$ and an electric resistance ratio of $1.5 \times 10^{10}$ Ω·cm. The resistance layer 7 includes tresistance layers 71, 72, 73, 74, 75, and 76 having respective electric resistance ratios different from each other. Materials of the resistance layers 71, 72, 73, 74, 75, and 76 are a compound whose main component is zinc oxide (ZnO). Thicknesses of the resistance layers 71, 72, 73, 74, 75, and 76 are 0.25 μm. The resistance layer 71 has a sheet resistance of $4 \times 10^8 \Omega$ and an electric resistance ratio of $1 \times 10^4$ Ω·cm. The resistance layer 72 has a sheet resistance of $20 \times 10^8 \Omega$ and an electric resistance ratio of $5 \times 10^4$ Ω·cm. The resistance layer 73 has a sheet resistance of $30 \times 10^8 \Omega$ and an electric resistance ratio of $7.5 \times 10^4$ Ω·cm. The resistance layer 74 has a sheet resistance of $40 \times 10^8 \Omega$ and an electric resistance ratio of $10 \times 10^4$ Ω·cm. The resistance layer 75 has a sheet resistance of $60 \times 10^8 \Omega$ and an electric resistance ratio of $15 \times 10^4$ Ω·cm. The resistance layer 76 has a sheet resistance of $80 \times 10^8 \Omega$ and an electric resistance ratio of $20 \times 10^4$ Ω cm. A material of the liquid crystal layer 8 is nematic liquid crystal 5CB. A birefringence Δn of the nematic liquid crystal 5CB is 0.18 for light with a wavelength of 550 nm. A thickness of the liquid crystal layer 8 is 50 μm. A pretilt angle between the upper and lower surfaces of the liquid crystal layer 8 is 3°. The first voltage V1 is 1 V and its frequency is 100 Hz. The second voltage V2 is 2.5V and its frequency is 100 Hz. The second electrode layer 5 serves as a ground, and a voltage applied to the second electrode layer 5 is 0V.

In FIG. 14, a left end is a center position of the changeable power area 101 (102), and a distance from a right end to the left end is 10 mm. That is, a diameter of the changeable power area 101 (102) is 20 mm. In FIG. 14, an electrode 9 is located at the center of the annular electrode arrangement so that the orientations of the liquid crystal molecules are adjusted in the central part of the changeable power area 101 (102). The first voltage V1 is applied to the electrode 9. At positions where the first voltage V1 is applied, the liquid crystal molecules are horizontal and effective refractive indexes are high. At positions where the second voltage V2 is applied, the liquid crystal molecules rise according to a direction of an electric field and the effective refractive indexes are low. In an area between positions where the first and second voltages V1 and V2 are respectively applied, the voltage changes smoothly due to the action of the resistance layer 7, and thus the orientations of the liquid crystal molecules also change smoothly. As a result, a smooth-shaped refractive index distribution can be realized, so that a smooth optical phase difference distribution having a Fresnel lens shape can be acquired as illustrated in FIG. 15.

Figure 16:
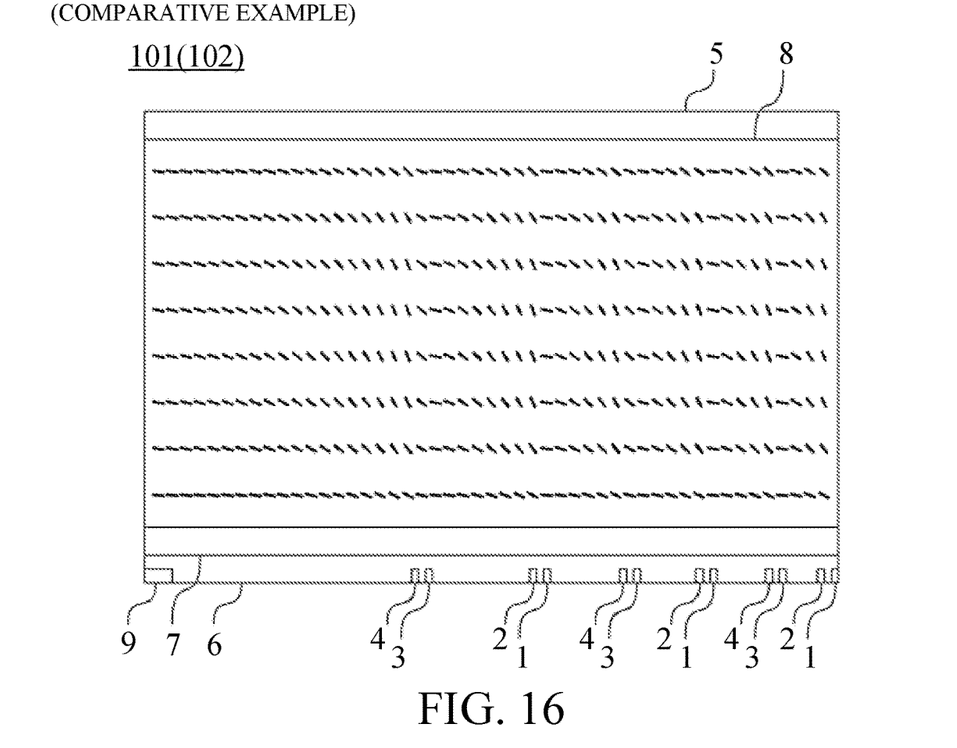
FIG. 16 is a diagram illustrating an orientation distribution of liquid crystal molecules in the first state (comparative example).
Figure 17:
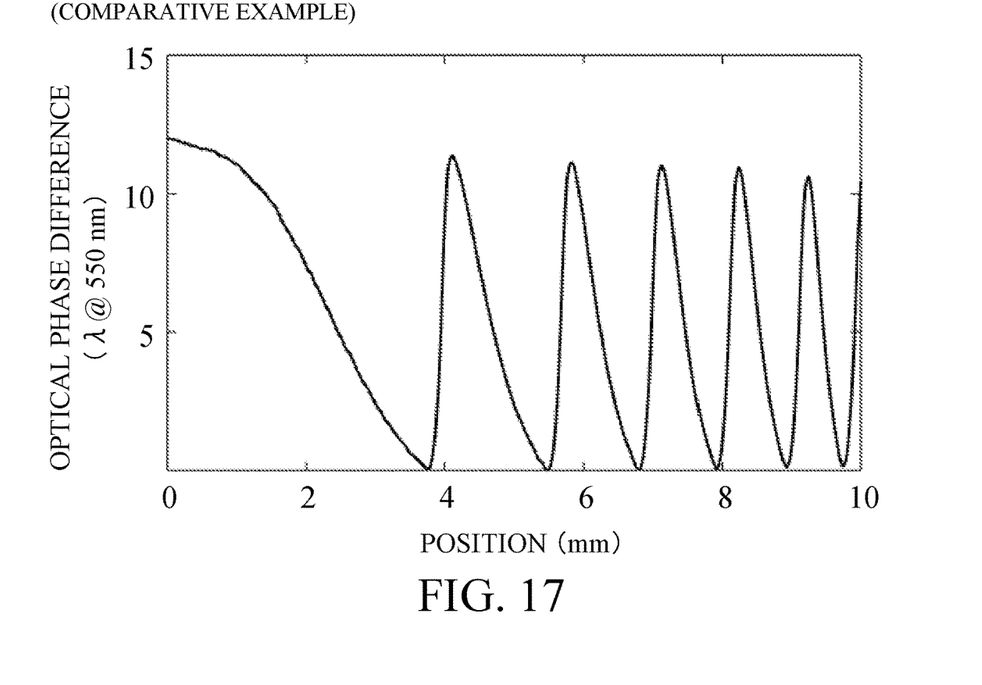
FIG. 17 is a diagram illustrating an optical phase difference distribution occurring in the liquid crystal layer in the first state (comparative example).

FIG. 16 is a diagram illustrating an orientation distribution of liquid crystal molecules in the first state according to a comparative example, acquired by simulation. FIG. 17 is a diagram illustrating an optical phase difference distribution occurring in the liquid crystal layer 8 in the first state according to the comparative example.

Conditions for the simulation are described below. Materials of the annular electrodes 1, 2, 3, and 4 and the second electrode layer 5 are ITO. A material of the insulation layer 6 is silicon dioxide ($SiO_2$). A thickness of the insulation layer 6 is 0.1 μm. The insulation layer 6 has a sheet resistance of $1 \times 10^{15} \Omega$ and an electric resistance ratio of $1 \times 10^{10}$ Ω·cm. A material of the resistance layer 7 is a compound whose main component is zinc oxide (ZnO). A thickness of the resistance layer 7 is 0.25 μm. The resistance layer 7 has a sheet resistance of $4 \times 10^8 \Omega$ and an electric resistance ratio of $1 \times 10^4 \Omega$ cm. A material of the liquid crystal layer 8 is nematic liquid crystal 5CB. A birefringence Δn of the nematic liquid crystal 5CB is 0.18 for light with a wavelength of 550 nm. A thickness of the liquid crystal layer 8 is 50 μm. A pretilt angle between the upper and lower surfaces of the liquid crystal layer 8 is 3°. The first voltage V1 is 1 V and its frequency is 100 Hz. The second voltage V2 is 2.5V and its frequency is 100 Hz. The second electrode layer 5 serves as a ground, and a voltage applied to the second electrode layer 5 is 0V.

In FIG. 17, a left end is a center position of the changeable power area 101 (102), and a distance from a right end to the left end is 10 mm. That is, a diameter of the changeable power area 101 (102) is 20 mm. In FIG. 17, an electrode 9 is disposed at the center of the annular electrode arrangement so that the orientations of the liquid crystal molecules are adjusted in the central part of the changeable power area 101 (102). The first voltage V1 is applied to the electrode 9. In FIG. 17, the optical phase difference amount of the peripheral part is smaller than the optical phase difference amount of the central part. Also, the optical phase difference distribution is different from the Fresnel lens shape. In this way, in a case where a resistance layer having a single electric resistance ratio is used, the desired optical phase difference amount and optical phase difference distribution cannot be acquired, resulting in a decrease in optical performance caused by insufficient added power and aberrations.

In order that the desired optical phase difference distribution is acquired from the central part to the peripheral part, the electric resistance ratio of the resistance layer 7 is made to be different depending on the position. That is, the resistance layer 7 is configured such that an electric resistance ratio at a first position of the resistance layer 7 is different from an electric resistance ratio at a second position of the resistance layer 7. The electric resistance ratio of the resistance layer 7 has a value acquired by dividing the sheet resistance of the resistance layer 7 by the thickness of the resistance layer 7. Therefore, in order that the electric resistance ratio of the resistance layer 7 is made to be different depending on the position, the sheet resistance of the resistance layer 7 may be made to be different depending on the position, or the thickness of the resistance layer 7 may be made to be different depending on the position. Between two electrodes to which different voltages are applied, the electric resistance ratio is to be changed according to the distance between the electrodes. The electric resistance ratio may be set to be low for a wide inter-electrode distance, and may be set to be high for a narrow inter-electrode distance. Thus, the electric resistance ratio of the resistance layer 7 may be made small in the center and large in the peripheral part. In this embodiment, the electric resistance ratio of the resistance layer 7 is configured such that the electric resistance ratio increases from the central part to the peripheral part.

An optical element including the electroactive lenses 11 and 12 or a similar structure can be used not only in the electronic glasses 10 but also in various optical devices such as binoculars and head-mounted displays. According to this embodiment, it is possible to easily manufacture an optical element having a plurality of states with different optical powers and an optical device having the same.

According to the above embodiment, it is possible to provide an optical element in which a changeable power area is sufficiently wide, and good vision with low distortion is provided in a non-electroactive state, and an optical device having the same.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-169990, filed on Oct. 18, 2021, which is hereby incorporated by reference herein in its entirety.

What is claimed is:

1. An optical element switchable between a first state having a first focal length and a second state having a second focal length comprising:
a first electrode layer, an insulation layer, a resistance layer, a liquid crystal layer, and a second electrode layer, which are arranged in order, and
wherein an electric resistance ratio of the resistance layer increases from a central part to a peripheral part.

2. The optical element according to claim 1, wherein the resistance layer includes a plurality of resistance layers having respective electric resistance ratios different from each other.

3. The optical element according to claim 1, wherein an electric resistance ratio of the resistance layer is $1 \times 10^2$ Ω·cm or more and $1 \times 10^7$ Ω·cm or less.

4. The optical element according to claim 1, wherein the electric resistance ratio of the insulation layer is $1 \times 10^8$ Ω·cm or more and $1 \times 10^{12}$ Ω·cm or less.

5. The optical element according to claim 1, wherein a following inequality is satisfied:

$$1 \times 10^{-7} < R2/R1 < 1 \times 10^{-3}$$

where R1 represents an electric resistance ratio of the insulation layer, and R2 represents an electric resistance ratio of the resistance layer.

6. The optical element according to claim 1, wherein the first electrode layer includes a first annular electrode, a second annular electrode, a third annular electrode, and a fourth annular electrode.

7. The optical element according to claim 6, wherein in the first state, a distance on the first electrode layer from a central part to a position where an optical phase difference switches is expressed by an equation:

$$rn = n^{1/2} \times r1$$

where rn (an index n is an integer of 2 or more) represents the distance, and r1 represents a distance from the central part to a position closest to the center in positions at each of which the optical phase difference switches, and wherein the optical element makes, different between the first state and the second state, a voltage applied to an annular electrode located at a position at which the optical phase difference switches and at which the index n is an odd number.

8. The optical element according to claim 6, wherein in the first state, a first voltage is applied to the first annular electrode and the third annular electrode, and a second voltage is applied to the second annular electrode and the fourth annular electrode.

9. The optical element according to claim 6, wherein in the second state, a first voltage is applied to the first annular electrode, a second voltage is applied to the second annular electrode, a third voltage is applied to the third annular electrode, and a fourth voltage is applied to the fourth annular electrode.

10. The optical element according to claim 6, wherein magnitudes of the third voltage and the fourth voltage are equal to an average of magnitudes of the first voltage and the second voltage.

11. The optical element according to claim 1, wherein the first focal length is shorter than the second focal length.

12. The optical element according to claim 1, wherein an electric resistance ratio at a first position of the resistance layer is different from an electric resistance ratio at a second position of the resistance layer, and
wherein in a case where a sheet resistance of the resistance layer is uniform, a thickness at the first position of the resistance layer is different from a thickness at the second position of the resistance layer.

13. The optical element according to claim 1, wherein an electric resistance ratio at a first position of the resistance layer is different from an electric resistance ratio at a second position of the resistance layer, and
wherein in a case where a thickness of the resistance layer is uniform, a sheet resistance at the first position of the resistance layer is different from a sheet resistance at the second position of the resistance layer.

14. An optical device comprising:
an optical element switchable between a first state having a first focal length and a second state having a second focal length; and
at least one processor configured to execute a plurality of tasks including a controlling task configured to switch the optical element between the first state and the second state,
wherein the optical element includes a first electrode layer, an insulation layer, a resistance layer, a liquid crystal layer, and a second electrode layer, which are arranged in order, and
wherein an electric resistance ratio of the resistance layer increases from a central part to a peripheral part.

15. The optical device according to claim 14, wherein the resistance layer includes a plurality of resistance layers having respective electric resistance ratios different from each other.

16. The optical device according to claim 14, wherein an electric resistance ratio of the resistance layer is $1 \times 10^2$ Ω·cm or more and $1 \times 10^7$ Ω·cm or less.

17. The optical device according to claim 14, wherein the electric resistance ratio of the insulation layer is $1 \times 10^8$ Ω·cm or more and $1 \times 10^{12}$ Ω·cm or less.

18. The optical device according to claim 14, wherein a following inequality is satisfied:

$$1 \times 10^{-7} < R2/R1 < 1 \times 10^{-3}$$

where R1 represents an electric resistance ratio of the insulation layer, and R2 represents an electric resistance ratio of the resistance layer.

19. The optical device according to claim 14, wherein the first electrode layer includes a first annular electrode, a second annular electrode, a third annular electrode, and a fourth annular electrode.

20. The optical device according to claim 14, wherein the first focal length is shorter than the second focal length.

* * * * *